United States Patent [19]

Wnenchak

[11] Patent Number: 5,368,734
[45] Date of Patent: Nov. 29, 1994

[54] TRIBOELECTRIC FILTRATION MATERIAL

[75] Inventor: Ray Wnenchak, Newark, Del.

[73] Assignee: W. L. Gore & Associates, Inc., Newark, Del.

[21] Appl. No.: 171,245

[22] Filed: Dec. 20, 1993

Related U.S. Application Data

[63] Continuation of Ser. No. 979,946, Nov. 23, 1992, abandoned.

[51] Int. Cl.$^5$ ............................................. B01D 24/00
[52] U.S. Cl. ................... 210/505; 210/500.1; 210/500.27; 210/500.38; 210/503; 428/280; 428/286; 428/288; 55/527; 55/528
[58] Field of Search ........... 210/500.1, 500.38, 500.21, 210/503, 505, 500.27; 428/422, 285, 286, 287, 280, 288, 421; 55/486, 525–528; 264/505; 204/265

[56] References Cited

U.S. PATENT DOCUMENTS

| | | | |
|---|---|---|---|
| 3,307,332 | 12/1964 | Grace et al. | 55/528 |
| 3,500,618 | 6/1968 | Sokol | 55/527 |
| 3,953,566 | 4/1976 | Gore | 264/505 |
| 4,177,149 | 12/1979 | Rosenberg | 210/500.21 |
| 4,664,812 | 5/1987 | Klein | 210/266 |
| 4,798,760 | 1/1989 | Diaz-Kotti | 428/280 |
| 4,798,850 | 1/1989 | Brown | 521/134 |
| 5,066,319 | 11/1991 | Lippold | 55/528 |
| 5,213,882 | 5/1993 | Sassa et al. | 428/224 |
| 5,216,204 | 6/1993 | Dudek et al. | 174/102 |
| 5,229,200 | 7/1993 | Sassa et al. | 428/280 |

FOREIGN PATENT DOCUMENTS

| | | |
|---|---|---|
| 0395331 | 4/1990 | European Pat. Off. |
| 0488822 | 12/1991 | European Pat. Off. |
| 1563320 | 4/1968 | France |
| 235831 | 5/1986 | German Dem. Rep. |
| 2190689 | 11/1987 | United Kingdom |
| 9114503 | 10/1991 | WIPO |
| 9312281 | 6/1993 | WIPO |

OTHER PUBLICATIONS

Smith, et al., Generation of Triboelectric Charge in Textile Fiber Mixtures . . . Journal of Electrostatics, 1988, pp. 81–98.
Keithley Instruments Inc. 1984 sheet showing a triboelectric series table.

*Primary Examiner*—Frank Spear
*Assistant Examiner*—Ana M. Fortuna
*Attorney, Agent, or Firm*—David J. Johns

[57] ABSTRACT

An electrically charged air filter which comprises a blend of clean expanded porous polytetrafluoroethylene fibers and clean polyamide fibers.

5 Claims, No Drawings

TRIBOELECTRIC FILTRATION MATERIAL

This application is a continuation, of U.S. application Ser. No. 07/979,946 filed Nov. 23, 1992, abandoned.

FIELD OF THE INVENTION

This invention relates to triboelectric filtration media and more particularly to triboelectric air filtration media of blended fibers.

BACKGROUND OF THE INVENTION

Triboelectrification is the transfer of electric charge, by contact or by friction, between pieces of different, polymeric materials. Materials may be approximately ranked on a "Triboelectric scale" regarding their tendency give or receive electrons, i.e., become positively or negatively charged. Such scales vary somewhat by researcher and method, but generally tend to agree. The combination of dissimilar, usually fibrous, materials to create a triboelectric enhancement of air filtration media is known in prior art. On contact of polymers having different tendencies to give or receive electrons, localized electrical charges accumulate. These local electric fields aid in capturing airborne particles and make a blend of dissimilar materials useful as air filters. One such filter, described in British Patent 384052 comprises wool fibers and resin particles. A combination of clean fibers of polyolefin and clean fibers of a polymer consisting of one or more halogen or —CN substituted hydrocarbons is described in Brown U.S. Pat. No. 4,798,850.

In an article "Generation of Triboelectric Charge In Textile Fiber Mixtures and Their Use as Air Filters" from the *Journal of Electrostatics*, volume 21 (1988), pages 81–98, other fibrous polymers were mixed and tested for their triboelectric effect. The article states that many yarns of different types were tested, the best was found to be a combination of polypropylene with modacrylic fibers and is the one also exemplified in U.S. Pat. No. 4,798,850.

Fiber mixtures of ordinary polytetrafluoroethylene (PTFE) and glass fibers available commercially and are known to have triboelectric properties. Fibers of ordinary PTFE are commonly made by mixing a dispersion of PTFE particles in water with a cellulosic binder, forcing the dispersion through a spinnerette, and heating the resulting fiber until the PTFE particles become sintered together and the cellulose largely burned away.

SUMMARY OF THE INVENTION

It has now been discovered that a specialized form of polytetrafluoroethylene, namely porous, expanded polytetrafluoroethylene, when mixed in fiber form with fibers of a polyamide result in an air filtration, i.e., particle retention, media of good filtration efficiency and cleanliness.

DESCRIPTION OF THE INVENTION

Expanded porous polytetrafluoroethylene (ePTFE) is a form of PTFE that has been described as a remarkable new material and one that "differs from other processed forms of Teflon." Teflon resin is ordinary PTFE. Expanded porous PTFE is made by stretching ordinary PTFE at certain rates and temperatures as described in Gore U.S. Pat. No. 3,953,566. The resulting ePTFE consists of a microporous structure of nodes interconnected by fibrils.

To obtain fibers of ePTFE a sheet of ePTFE can be slit in fiber widths. Porous expanded PTFE fibers can be obtained from W. L. Gore & Associates, Inc.

The polyamide fibers used herein can be obtained commercially. Representative polyamide fibers include nylon 66, nylon 612 and the like. Nylon 66 is preferred.

To prepare the mixtures of this invention, fibers of ePTFE and fibers of polyamide are mixed in an ordinary carding machine. The fibers are usually about 5 to 7.6 cm long because most carding machines use that length fiber. The ratio of the two fibers can be any ratio that produces triboelectrification between the fibers. Because carding is usually easier to carry out when the majority of fibers are polyamide, it is preferred that a preponderance of the blend be polyamide. The fibers become electrically charged during carding. By "electrically charged" is meant that triboelectrification has occurred and an electrical charge has been transferred. The blended fibers hold the electrical charge and it is this charge that effects capture of small particles during filtration operations.

The PTFE and the polyamide are preferable free of any solvent or lubricant that may be present. Any solvent or lubricant present can be removed by washing in an aqueous surfactant bath and rinsing with deionized water. By "clean" is meant that the fibers have no coating of lubricant or anti-static agent, or that any such coating was removed before blending, for example by scouring with a nonionic detergent. Preferably also, the nylon fibers are crimped.

The carded blend can be needled to form a felt, if desired.

Example 1

200 grams expanded porous PTFE fiber 7.6 cm long and 3 denier was blended with 1000 g crimped nylon 66 fiber 5.08 cm long and 3 denier (obtained from The DuPont Company) in a standard carding machine, and then lightly needled to form a coherent manageable felt batt.

The fibers became electrically charged by the rubbing and friction that occurs during the carding operation, and remain electrically charged due to their close proximity to one another.

The nylon 66 used had been cleaned by washing the fibers in a hot (about 140° C.) aqueous bath containing a non-ionic surfactant followed by washing with deionized water. The ePTFE fibers were already free of solvent or lubricant.

A number of samples were tested as described below.

COMPARISON 1

Ordinary PTFE fibers 7.6 cm long, 3 denier obtained from the DuPont Co. were mixed with identical nylon 66 fibers as were used in Example 1 at the same weight ratio and by the same carding and needling procedure. A number of samples were prepared by this procedure.

Test Results for Example 1 and Comparison 1 Samples

Several samples in the form of batts of ePTFE/nylon 66 prepared according to Example 1 and several samples in the form of batts of ordinary PTFE/nylon 66 were prepared according to Comparison 1.

These samples were tested for air filtration efficiency and quality. The test apparatus was a filter media efficiency tester built by W. L. Gore & Associates, Inc. of the type using solution atomization as the aerosol particle source any laser aerosol spectrometers as the aerosol particle detectors. The aerosol particle source was an atomizer (a Model 3076 made by Thermal Systems Inc. of St. Paul, Minn.), which used a dilute NaCl solution. The aerosol spectrometers were two Model LAS-X particle counters made by Particle Measuring Systems Inc. of Boulder, Colo., measuring upstream and then downstream of the filter medium under test. The apparatus was under computer control.

In Table 1 below the mass of the sample is recorded, the velocity of the aerosol passing through the sample is recorded, resistance to airflow is recorded, efficiency of capture of 0.1 micrometer sodium chloride particles is recorded, efficiency of capture of 0.3 micrometer particles is also recorded. Because all filter media do not have the same resistance to air flow, it is usually better to compare filter media by quality factor (Qf), which is an accepted measure of performance as determined by the compromise between particle capture efficiency and air permeability. This data appears in the last column of Table 1. Quality factor is defined as $$Q_f = \frac{-\log_{10}(P)}{R}.$$

As used herein P is the penetration of 0.1 μm diameter particles, and R is the resistance to flow in mm of $H_2O$ at a filtration velocity of 3.2 m/min. (10.5 ft/min.)

tion test was performed for thirty minutes using trichlorotrifluoroethane as a solvent to compare the cleanliness of the polypropylene/modacrylic combination versus the ePTFE/nylon 66 combination of the invention. For comparison between materials, samples of 10.937 g were tested (equivalent to 100 square inches (645.1 $cm^2$) of 5 ounce/square yard (169.49 $g/m^2$) of material), and the results are given in terms of $mg/m^2$ of 5 ounce/square yard (169.49 $g/m^2$) material. The results of the test are as follows:

| Material | Milligrams of Contaminate (Per $m^2$ of filter material) |
|---|---|
| Polypropylene/modacrylic | 362.86 |
| " | 348.59 |
| " | 223.05 |
| ePTFE fiber/nylon 66 (20% ePTFE) | 19.99 |
| ePTFE fiber/nylon 66 (30% ePTFE) | 16.89 |
| ePTFE fiber/nylon 66 (40% ePTFE) | 10.39 |

The felts of ePTFE fiber and nylon 66 fiber showed much less retention of organic contaminates than did the polypropylene/modacrylic felt combination.

To test for filter efficiency, the felts were tested in the filter efficiency tester used further above. Results were as follows:

TABLE 1

| Sample | Mass (g) | Mixture | Velocity (ft/min.) | Resistance (mm $H_2O$) | Efficiency @ .1 μm | Efficiency @ .3 μm | Quality Factor |
|---|---|---|---|---|---|---|---|
| 1 | 4.5949 | ePTFE/Nylon | 10.4 | 0.3118 | 94.6% | 93.3% | 4.07 |
| 2 | 3.6939 | " | 10.3 | 0.3148 | 95.3% | 94.6% | 4.23 |
| 3 | 3.8458 | " | 10.8 | 0.2892 | 95.6% | 95.6% | 4.72 |
| 4 | 3.8520 | " | 10.4 | 0.3916 | 95.8% | 95.5% | 3.51 |
| 5 | 3.9500 | " | 11.2 | 0.3283 | 95.5% | 95.3% | 4.10 |
| 6 | 3.9761 | " | 10.4 | 0.3017 | 95.2% | 93.8% | 4.38 |
| 7 | 4.1838 | " | 10.9 | 0.2892 | 95.6% | 96.9% | 4.70 |
| 8 | 4.5665 | " | 10.7 | 0.2733 | 96.2% | 96.1% | 5.21 |
| 1 | 2.9367 | PTFE/Nylon | 10.3 | 0.3066 | 77.0% | 70.2% | 2.06 |
| 2 | 3.1172 | " | 10.0 | 0.3643 | 77.0% | 68.6% | 1.75 |
| 3 | 3.3569 | " | 9.9 | 0.2523 | 77.6% | 71.1% | 2.58 |
| 4 | 3.3900 | " | 10.7 | 0.3904 | 79.4% | 71.6% | 1.76 |
| 5 | 3.4153 | " | 10.7 | 0.3044 | 80.6% | 74.7% | 2.34 |
| 6 | 3.4629 | " | 10.7 | 0.3606 | 77.5% | 71.9% | 1.79 |
| 7 | 5.8472 | " | 10.7 | 0.5883 | 83.2% | 77.8% | 1.32 |

As is seen, both the efficiency and the quality factor are superior for the ePTFE/nylon 66 batt of the invention.

Comparison Example 2

For many applications, a desirable property of filters is cleanliness, specifically the amount of extractable organic contaminant present in the filter media. A representative triboelectret filter made of a felt of a mixture of a polypropylene and modacrylic fibers (Technostat) was obtained from Hepworth Minerals & Chemicals, Ltd. The felt had a mass of 110 $g/m^2$. Several combinations of ePTFE and nylon 66 fibers were produced as in Example 1 to compare to the polypropylene/modacrylic felt. The mixtures tested were 20 weight % and 40 weight % ePTFE to nylon 66 by weight. The nylon had been cleaned by washing in a hot bath of non-ionic surfactant, tetrasodium pyrophosphate and deionized water, and rinsed in deionized water. The fibers were mixed in a carding machine and needled to product a felt that was about 5 oz/yd² (150 g/m2). To test for presence of extractable organic contaminants, a standard Soxhlet extrac-

| Material | Ratio of ePTFE to nylon 66 | Efficiency @ .1 m | Resistance mm $H_2O$ | Velocity ft/min | Quality Factor |
|---|---|---|---|---|---|
| ePTFE fiber/ nylon 66 | 20/80 | 96.24 | .2733 | 10.76 | 5.22 |
|  | 40/60 | 97.63 | .2971 | 14.14 | 5.47 |
| Poly- propylene/ modacrylic | N/A | 96.67 | .2988 | 10.19 | 4.94 |
|  | N/A | 97.09 | .2729 | 10.00 | 5.63 |

I claim:

1. A electrically charged filter which comprises a blend of clean expanded pourous polytetrafluoroethylene fibers and clean polyamide fibers.

2. The filter of claim 1 wherein the polyamide fibers are crimped.

3. The filter of claim 1 or 2 wherein the polyamide is nylon 66.

4. The filter of claim 3 in the form of a carded batt.

5. The filter of claim 3 in the form of a felt.

* * * * *